United States Patent [19]
Sutrina

[11] Patent Number: 5,606,247
[45] Date of Patent: Feb. 25, 1997

[54] MECHANICAL GEAR DRIVE SYSTEM HAVING INTEGRAL ELECTRIC POWER GENERATION CAPABILITY

[75] Inventor: Thomas A. Sutrina, Rockford, Ill.

[73] Assignee: Sundstrand Corporation, Rockford, Ill.

[21] Appl. No.: 436,064

[22] Filed: May 5, 1995

[51] Int. Cl.$^6$ ........................................................... H02P 9/40
[52] U.S. Cl. ................................. 322/50; 322/89; 322/90; 310/190; 310/184; 310/187
[58] Field of Search ............................. 322/50; 310/168, 310/254, 179; 29/596

[56] References Cited

U.S. PATENT DOCUMENTS

| Re. 31,278 | 6/1983 | Schmider | 310/268 |
|---|---|---|---|
| 3,917,997 | 11/1975 | Sidor | 324/166 |
| 4,766,362 | 8/1988 | Sadvary | 322/50 |
| 4,883,999 | 11/1989 | Hendershot | 310/254 |
| 4,995,159 | 2/1991 | Hancock et al. | 29/596 |
| 5,015,903 | 5/1991 | Hancock et al. | 310/168 |
| 5,053,672 | 10/1991 | Clapham | 310/334 |
| 5,111,095 | 5/1992 | Hendershot | 310/168 |
| 5,130,593 | 7/1992 | Connell | 310/256 |

OTHER PUBLICATIONS

James R. Hendershot, *Short Flux Paths Cool SR Motors*, Machine Design, Sep. 21, 1989, pp. 106–111.

*Primary Examiner*—Steven L. Stephan
*Assistant Examiner*—Nicholas Ponomarenko
*Attorney, Agent, or Firm*—Jeffery J. Makeever

[57] ABSTRACT

A mechanical gear drive system capable of generating electric power comprises a plurality of gears having a plurality of teeth separated by a tooth gap, a U-shaped core having two legs separated by at least one tooth gap, and a yoke. This core is positioned in close proximity to the teeth of the gear. A coil is wound on the yoke, and a converter selectively couples and decouples this coil from a dc power source. The converter has at least a first and a second switch and at least a first and a second diode for cross-coupling the coil to the source to allow current flow back when the switches are disabled. The converter enables the switches prior to alignment of the teeth of the gear with the legs of the core. This couples the coil to the source of dc power and allows dc current to flow from the source through the switches and the coil. When the converter disables the switches after alignment of the teeth with the legs, the coil is decoupled from said source. DC current is then forced to flow back from the coil, through the diodes, and to the source to allow generation of electric. The source of dc power comprises a second U-shaped core having two legs and a permanent magnetic yoke. A second coil is wound on the magnetic yoke, and a rectifier is coupled to this coil for rectifying the electrical output generated in response to the rotation of the gear.

24 Claims, 12 Drawing Sheets

MECHANICAL GEAR DRIVE SYSTEM HAVING INTEGRAL ELECTRIC POWER GENERATION CAPABILITY

FIELD OF THE INVENTION

The instant invention relates to mechanical gear drive systems, and more particularly to a mechanical gear drive system having integral therewith a U-shaped core and a coil to generate electricity by switched reluctance action through the relative movement of the gear and the core.

BACKGROUND ART

The increased use and reliance on computers, electronics, and other electrical driven devices demand that power be available under all operating conditions. This requirement is paramount when the application is for an aircraft or helicopter, for obvious safety of flight reasons. As an example, the most advanced helicopters being developed are utilizing 'fly-by-wire' systems. These systems centralize flight control in a series of computers linking pilot inputs to control, and utilize electrical driven actuators as opposed to a direct link using cables, pulleys, and hydraulic pressure for primary control. In such systems it is critical that the electric power generation be maintained over all operating conditions to ensure maintenance of proper control over the aircraft.

For a fly-by-wire helicopter system electric power sufficient to control flight surface motion is required whenever the rotor is capable of supplying a force strong enough to actually move the helicopter. For a typical system this occurs as low as approximately twenty percent of rated rotor speed. Prior systems have utilized an electronic power converter in addition to a battery in an attempt to supply the power required for the fly-by-wire systems. While such a system is possible, the added weight and increased size of a battery capable of supplying enough power to the fly-by-wire systems for an extended period is prohibitive. Additionally, such a system has a limited time of operation due to the discharge characteristics of the battery, and the battery is negatively effected by the temperature extremes at either end of the flight envelope.

Another system architecture which has been considered for similar applications utilizes a permanent magnet generator directly driven by the main rotor gearbox. This system is adversely affected by the large speed range. To meet system power requirements under all operating conditions, the permanent magnet generator must be sized at the twenty percent speed condition. At normal operating speeds, however, excessive voltage or power is generated. This excess power must be purged as heat, and directly decreases the amount of energy available to the lift generating rotor.

Another system architecture which has been considered for similar application utilizes a hydraulic driven permanent magnet generator that is connected to the flight critical hydraulic circuit that actuates the rotors. This system, however, also extracts energy from the lift generating rotor. The hydraulic driven permanent magnet generator additionally must be sized far the extremes of temperature. This defines the flow which must be continuously extracted from the flight critical hydraulic circuit during all phases of flight which will effect the performance and efficiency of the system as a whole.

The helicopter, however, utilizes a gearbox which operates to change the speed and torque from the engine to turn the rotor. It is a principle objective of the instant invention, therefore, to provide a gearbox which includes, integral therewith, a new and improved electric power generation system. More specifically, it is a principle objective of the instant invention to utilize the teeth of a rotating gear which meshes with other gears within this gear box as salient poles forming a switched reluctance rotor. This will allow generation of electric power in the environment and temperature ranges of the mechanical gearbox without the addition of a separate generator and the associated loss in overall system efficiency. Additionally, this gearbox will provide a controlled output power regardless of the speed of the gears driving the rotor.

In addition, computers and other critical control electronics are also utilized in other types of systems which would be equally adversely affected by a sudden loss of power to their control circuitry. In these systems, such as chemical processing, nuclear processing, mining, manufacturing, etc., a back-up or emergency source of power is required to provide power to allow a controlled shutdown of the affected equipment, or to allow continued operation during the power loss event. One way to provide this emergency power is to utilize a stand-by generator which will cut-in when the primary source goes off line. This type of system is inefficient, however, because the generator must be running at all times to prevent a power loss event. Other systems utilize a battery to provide emergency power, but batteries have a limited life, require periodic maintenance, and are adversely effected by temperature extremes.

It is therefore a further object of the instant invention to provide a mechanical drive system utilized in such processing, mining, manufacturing, etc., which will additionally provide continuous electric power during operation of the drive system. This will allow continued controlled operation of the drive system during the main power loss event, or may allow a controlled shutdown of the drive system under power if desired. The instant invention, therefore, is directed at overcoming these and other problems present in the prior art.

SUMMARY OF THE INVENTION

An mechanical gear capable of the generation of electric power in accordance with the instant invention comprises a plurality of teeth separated by a tooth gap meshing with other gears within a gearbox. A U-shaped core having two legs separated by at least one tooth gap and a yoke is mounted in close proximity to the teeth of this gear, separated only by an airgap. A coil is wound on the yoke of the core, and an electronic converter selectively couples and decouples the coil from a dc power source. The converter has at least a first and a second switch and at least a first and a second diode for cross-coupling the coil to the source to allow current flow back when the switches are disabled. The converter enables the switches prior to alignment of the teeth of the gear with the legs of the core. This couples the coil to the source of dc power and allows dc current to flow from the source through the switches and the coil. When the converter disables the switches after alignment of the teeth with the legs, the coil is decoupled from the source. DC current is then forced to flow back from the coil, through the diodes, and to the source to allow generation of electric power. This power generation is the result of the relative motion between the gear teeth and the core. Additionally, the system may comprise more than one core and winding to form multiple output phases.

Further in accordance with the instant invention, the source of dc power comprises a second U-shaped core having two legs and a permanent magnetic yoke. This core is also positioned in close proximity to the teeth of the gear. A second coil is wound on the magnetic yoke, and a rectifier is coupled to this coil for rectifying the electrical output generated in response to the rotation of the gear. During operation of the gear, the alignment of each tooth with a leg of the core presents an opportunity to enable the switches. The converter then varies the percentage of opportunities at which the switches are enabled to allow control of the magnitude of electric power generated during rotation of this mechanical gear. This combination of the fixed flux permanent magnet generator and the controllable switched reluctance generators formed by the gear and the cores allow the generation of regulated electric power over a large speed range.

Additionally, the core, winding and associated electronics may be mounted in close proximity to other embodiments of mechanical drive systems to provide required electrical power. In these alternative embodiments the electric power is still generated in response to the relative motion of the drive system and the core and winding. One such system is a conveyer system having areas of magnetically permeable material and areas of non-magnetically permeable material. In such a system the core is mounted in close proximity to the conveyer, and the linear movement of the of the two areas in relation of the cores enables the associated converter to generate electric power through switched reluctance action. Additionally, in a piston, jackhammer, bobbin, ramrod, or other type system having a reciprocating motion of a magnetically permeable material, the core may be placed in close proximity to the plane of motion, or orthogonal thereto, to allow generation of electric power as summarized above. Also, the rotation of a fan blade or propeller may provide the relative motion required by the core to generate electric power.

BRIEF DESCRIPTION OF THE DRAWINGS

While the specification concludes with claims particularly pointing out and distinctly claiming that which is regarded as the present invention, the organization, the advantages, and farther objects of the invention may be readily ascertained by one skilled in the art from the following detailed description when read in conjunction with the accompanying drawings in which:

DESCRIPTION OF THE PREFERRED EMBODIMENTS

Figure 1:
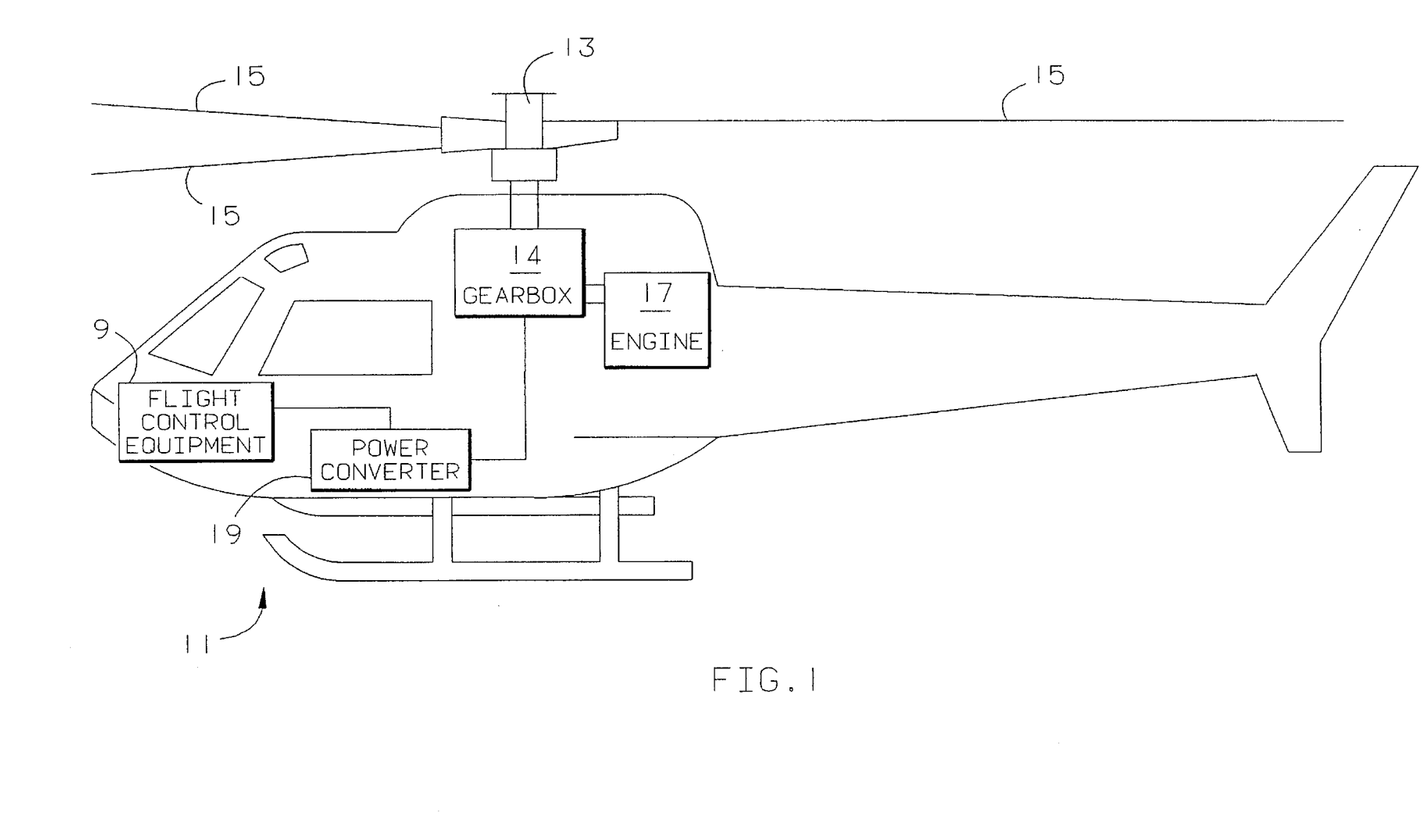
FIG. 1 is an outline block diagram of an embodiment of the instant invention.

FIG. 1 illustrates a helicopter 11 having a rotor 13 which is coupled to blades 15 to effectuate airborne flight. The rotor 13 is driven by an engine 17 through a gearbox 14 having a plurality of gears which convert the rotational energy generated by the engine 17 into useful torque and speed to drive the rotor 13. In an embodiment of the instant invention, the gearbox 14 also produces electric power in conjunction with an associated electronic conversion device 19. This device 19 controls the generation of electric power by the gearbox 14 to ensure that critical flight control equipment 9 remain powered during all phases of operation.

Figure 2:
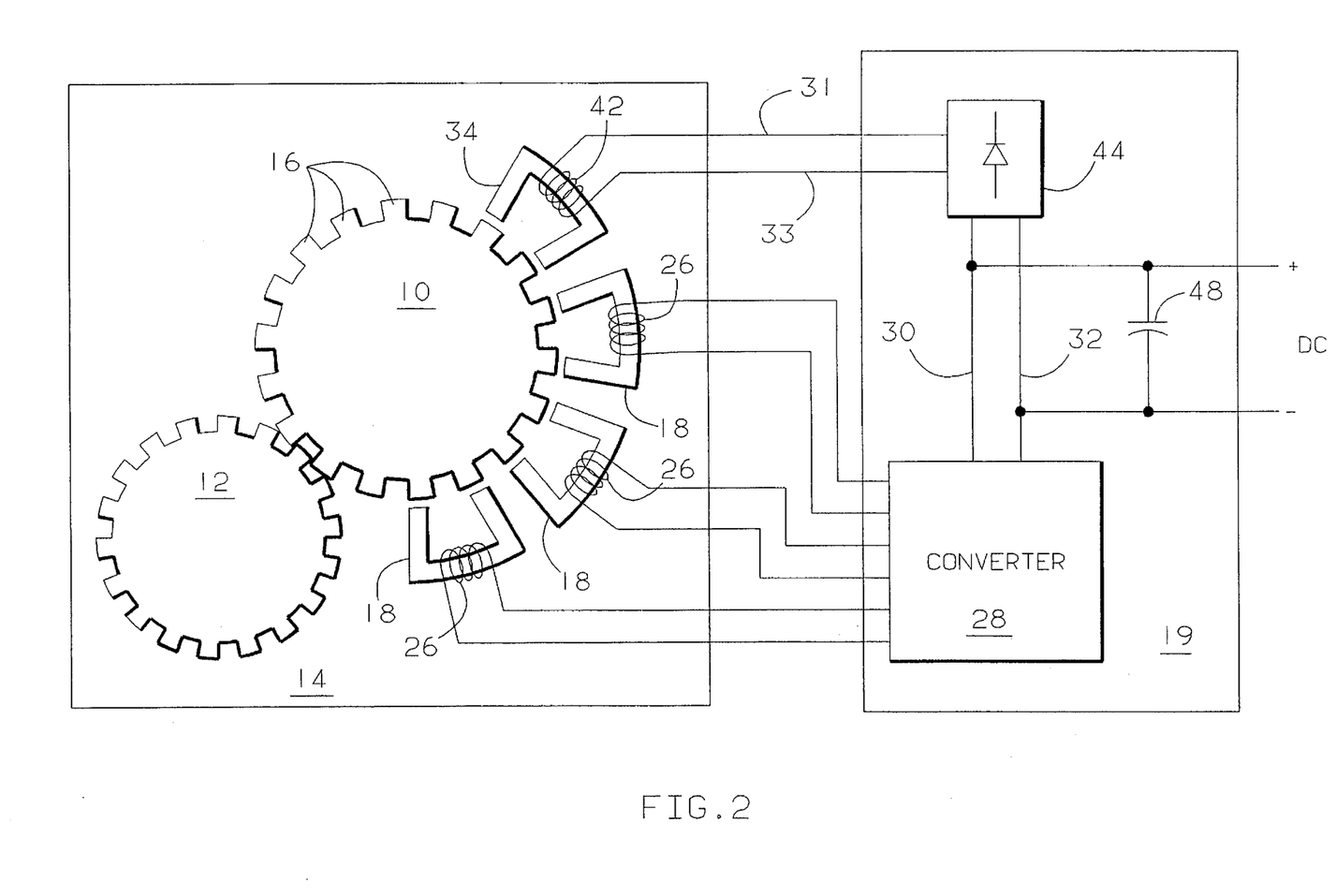
FIG. 2 is a schematic block diagram of an embodiment of the instant invention.
Figure 5:
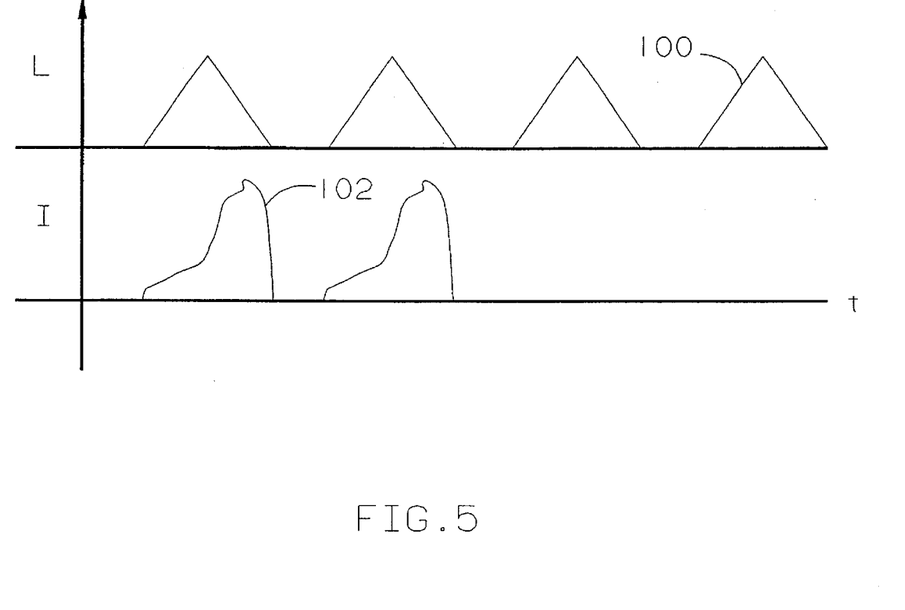
FIG. 5 is a waveform diagram illustrating an inductance profile and resulting current generated by an embodiment of the instant invention.

As illustrated in more detail in FIG. 2, the rotating gears 10 and 12 of a gearbox 14 of the instant invention, in addition to driving the rotor 13 of the helicopter, also generate electric power. In this exemplary system the teeth 16 of at least one of the gears 10 act as salient poles of a switched reluctance generator which act as means for repeatably increasing and decreasing inductive coupling to a stator. This stator of this generator is formed by a U-shaped core 18. As illustrated more clearly in FIG. 3, this core 18 comprises two legs 20 and 22, and a yoke 24. The legs 20 and 22 are separated by at lease one tooth gap (as defined by the separation between the teeth 16 of the gear 10). This allows an inductance profile having zones of increasing, decreasing, and minimal inductive coupling as illustrated in FIG. 5, trace 100. This inductance profile presupposes that the material of the gear is selected to be magnetically conductive. Such a gear may be metallic, or may be plastic or of composite material impregnated with magnetically conductive material.

Figure 6:
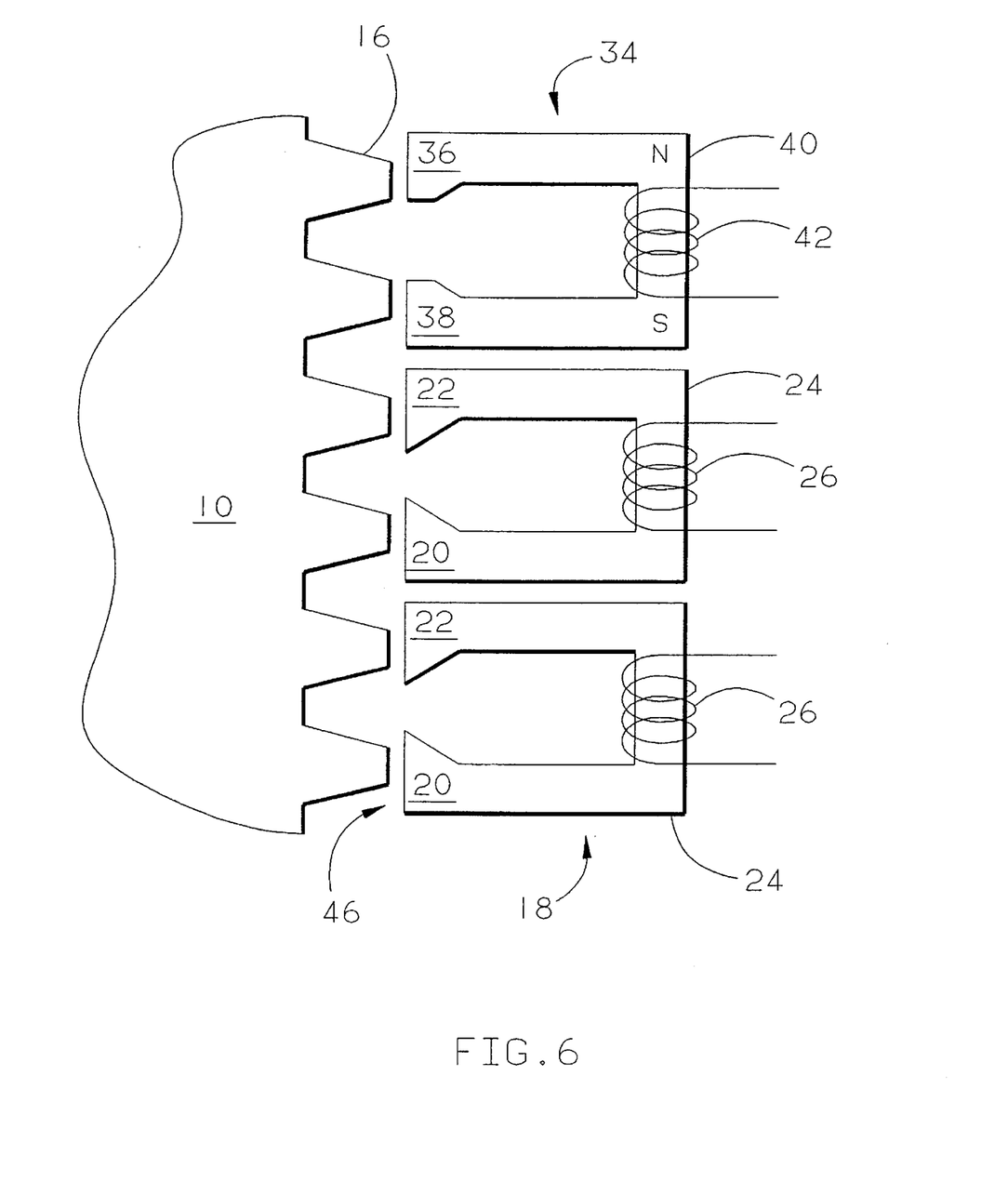
FIG. 6 is an invention enlarged sectional view of an aspect of the instant invention.
Figure 7:
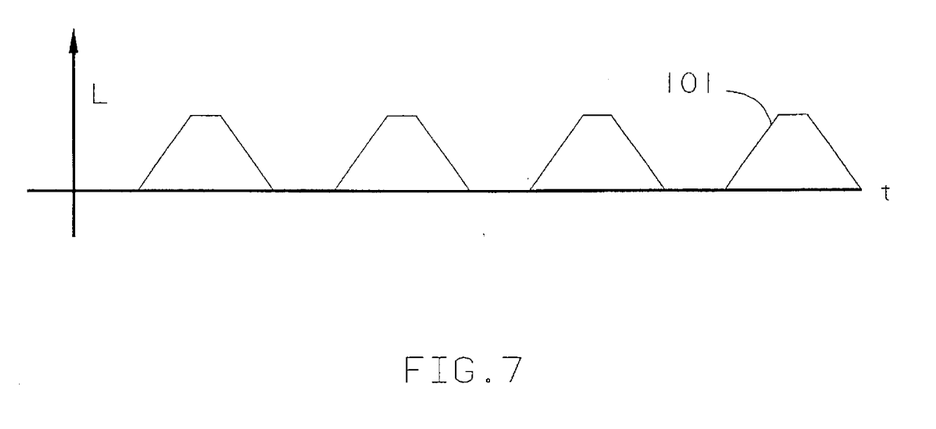
FIG. 7 is a waveform diagram illustrating an inductance profile generated by an embodiment of the instant invention.

The stator winding 26 is wound on the yoke 24 of the core 18 between the two legs 20 and 22. Alternatively, as illustrated in FIG. 6, the legs 20 and 22 may be flared at the bottom 46 to increase the inductive coupling time. The resulting inductance profile 101 first increases, then is maintained at a given level, then decreases as illustrated in FIG. 7. This geometry may be varied to adjust the inductance profile as desired, and to compensate for the tooth 16 geometry. Additionally, the gap between the legs may also be varied which will vary the zone of no inductive coupling on the inductance profile.

Figure 3:
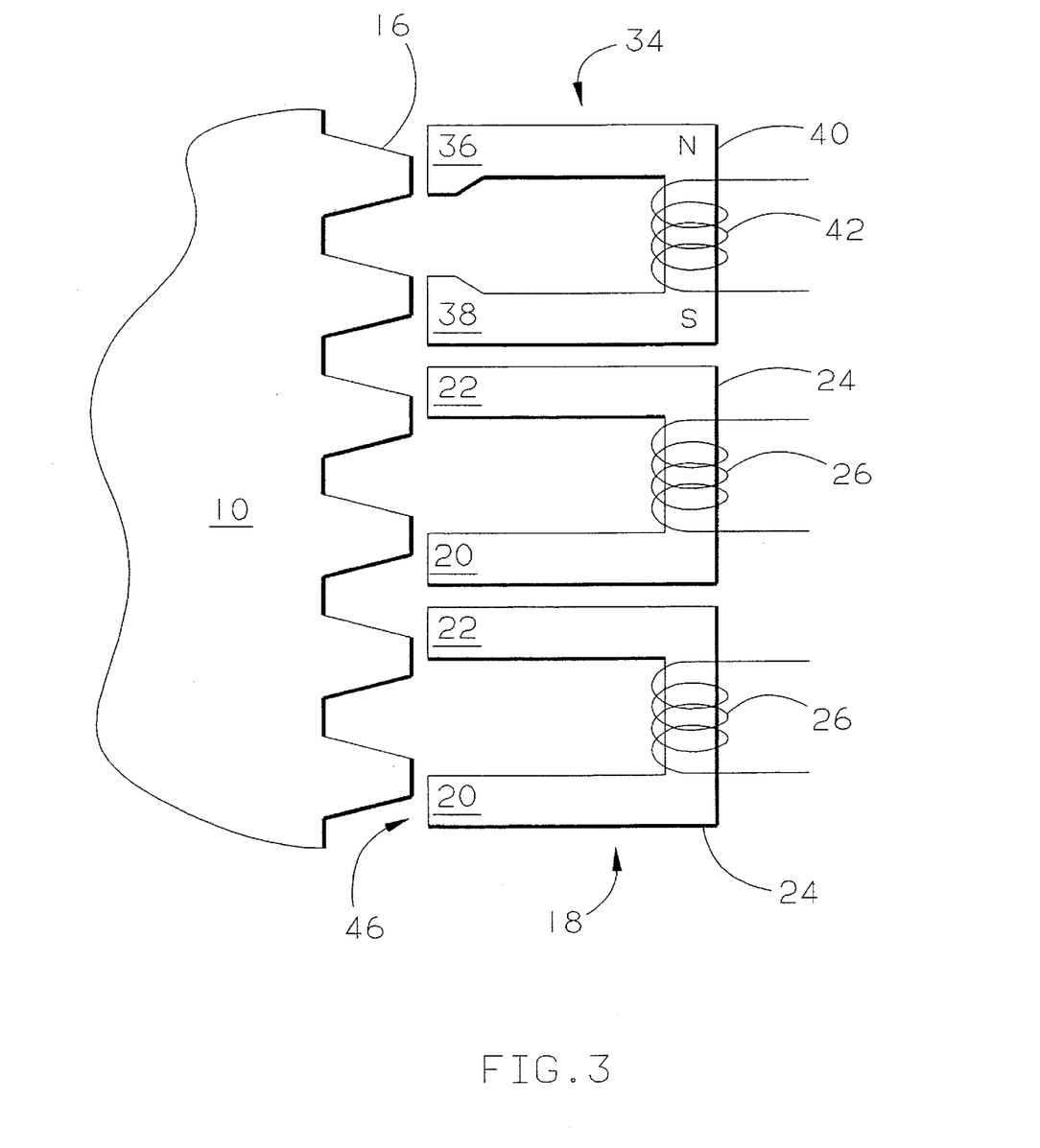
FIG. 3 is an invention enlarged sectional view of an aspect of the instant invention.

Referring again to FIG. 2, the windings 26 are coupled to a converter 28. This converter 28 acts as a means to switchably couple the windings 26 to a source of dc power on lines 30 and 32. As illustrated in this exemplary embodiment, the source of dc power is a permanent magnet generator comprising a second U-shaped core 34 placed in close proximity to the teeth 16 of the gear 10. As illustrated more clearly in FIG. 3, this core 34 comprises two legs 36 and 38, and a permanent magnetic yoke 40. As illustrated in FIG. 3, the legs 36 and 38 are flared slightly at the bottom. A stator winding 42 is wound on the magnetic yoke 40 and is coupled by lines 31 and 33 to a rectifier 44 to produce the dc power required by the converter 28 on lines 30 and 32, and to the converter 28 itself to communicate position information of the gear teeth 16 as shown in FIG. 2. In this way, the electrical output of the permanent magnet generator may be used by the converter 28 to determine the relative position of the gear teeth 16 and the legs 20 and 22 of the core 18 to control the enabling and disabling of the switches 50 and 52. Alternatively, a conventional position sensor may be utilized to provide gear tooth position information to the converter to allow proper turn-on and turn-off of the switches 50 and 52. Lines 30 and 32 are also used as a dc distribution bus to supply power to utilization equipment (not shown). A dc link capacitor 48 is typically utilized to maintain and smooth the dc power supplied by the converter 28 and the rectifier 44.

Figure 4:
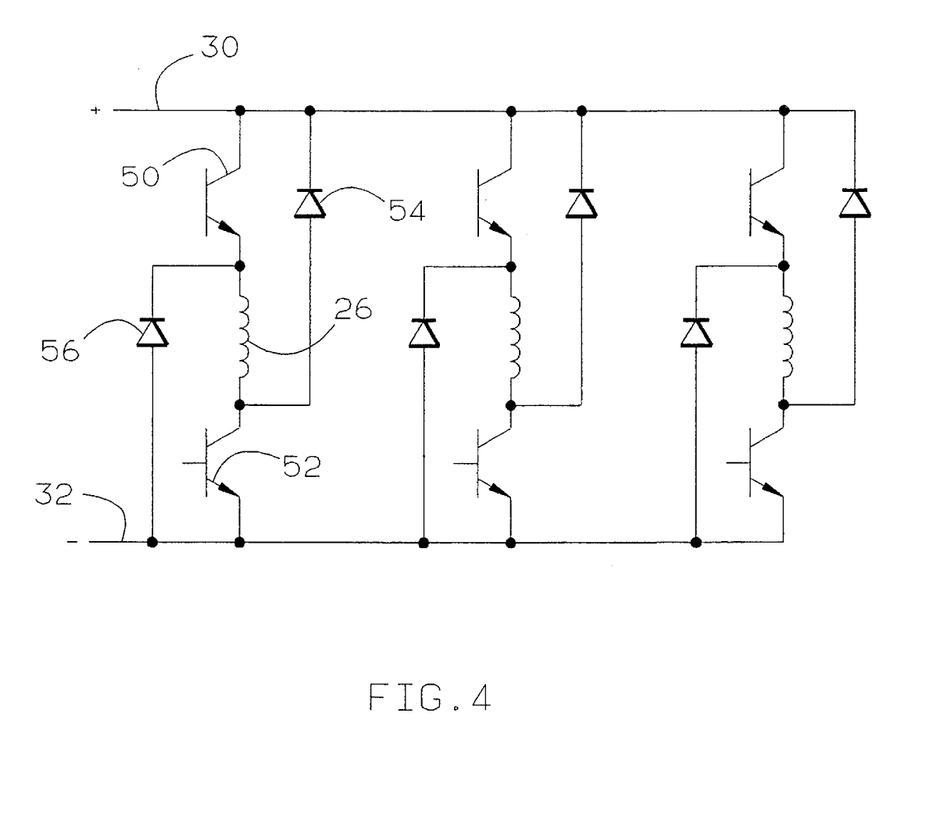
FIG. 4 is an electrical schematic of an embodiment of the instant.

An electrical schematic of an exemplary embodiment of the converter 28 of the instant invention is illustrated in FIG. 4. Each phase of the system comprises at least a first and second switching means, as illustrated by transistors 50 and 52, for coupling the winding 26 to the source of dc power and the dc distribution bus on lines 30 and 32. Each phase additionally comprises a first and second commutation means, as illustrated by diodes 54 and 56, which for current flow back when the transistors 50 and 52 are switched off. While this figure illustrates the use of transistors and diodes, it will be understood by one skilled in the art that any switching means such as IGBTs, MOSFETs, etc. are applicable to the instant invention as are other commutation means such as thyristors, MCTs, etc.

The converter 28 operates to enable the switches 50 and 52 at a time prior to alignment of the teeth 16 with the legs 20 and 22 of the core 24. This couples the winding 26 with the source of dc power on lines 30 and 32 and allows current to begin flowing through the winding. This is illustrated in FIG. 5 by trace 102. As the inductance begins to decrease as the teeth 16 and the legs 20 and 22 pass through alignment, the electro-motive force (emf) which is generated is in the direction to aid current flow. This acts to rapidly increase current flow through the winding. When the switches 50 and 52 are turned off, the phase current through the winding 26 will increase for a time, peak, and then decay as illustrated in FIG. 5. This current is forced to flow through the diodes 54 and 56 and back to the dc bus 30 and 32. The net dc current which is returned to the bus 30 and 32 is the sum of the currents from all of the phases, and produces a net generating effect. As the gear 10 is driven from an external source of rotational energy, this mode of operation produces a net increase of energy flow to the bus 30 and 32, and can sustain the bus voltage under a connected load.

In an alternate embodiment of the instant invention wherein at least the bottom 46 of the legs 20 and 22 of the core 18 is wider than the teeth 16, as illustrated in FIG. 6, the converter 28 operates to enable the switches 50 and 52 during alignment of the teeth 16 and the legs 20 and 22. This couples the winding 26 with the source of dc power on lines 30 and 32 and allows current to begin flowing through the winding 26. When sufficient current is flowing in the winding 26, one of the switches 50 or 52 is disabled. This forces the current to flow through diode 54 or 56 associated with the dc bus 30 and 32 and the enabled switch 52 or 50. As the legs 20 and 22 and the teeth 16 begin to move out of alignment, both switches are disabled to force current flow back to the dc bus 30 and 32 to generate net electric power as described above.

The specific method of controlling the bus voltage level may be conventional as known in the art, including turn-on and turn-off angle control, fixed angle control with adjustable current chopping, etc. Alternatively, as each alignment of the gear teeth 16 and the legs 20 and 22 presents an opportunity to generate power by enabling the switches 50 and 52 as described above, the voltage control may be accomplished by varying the percentage of opportunities at which the switched 50 and 52 are actually enabled. In this way, as the speed of the gear 10 increases, the percentage of opportunities at which the switches 50 and 52 are energized may be decreased to maintain a given output power level, and vise versa. This method of control also compensates for the increased power output of the permanent magnet generator 34 as the speed of the gear 10 increases. Additionally, more or fewer cores 18 may be used, each creating a phase of the generator as desired. These cores 18 may be physically located in relation to the gear teeth 16 and to each other to establish a phased electrical output. This allows better power quality (less tipple) and a smaller filter requirement.

Figure 8A:
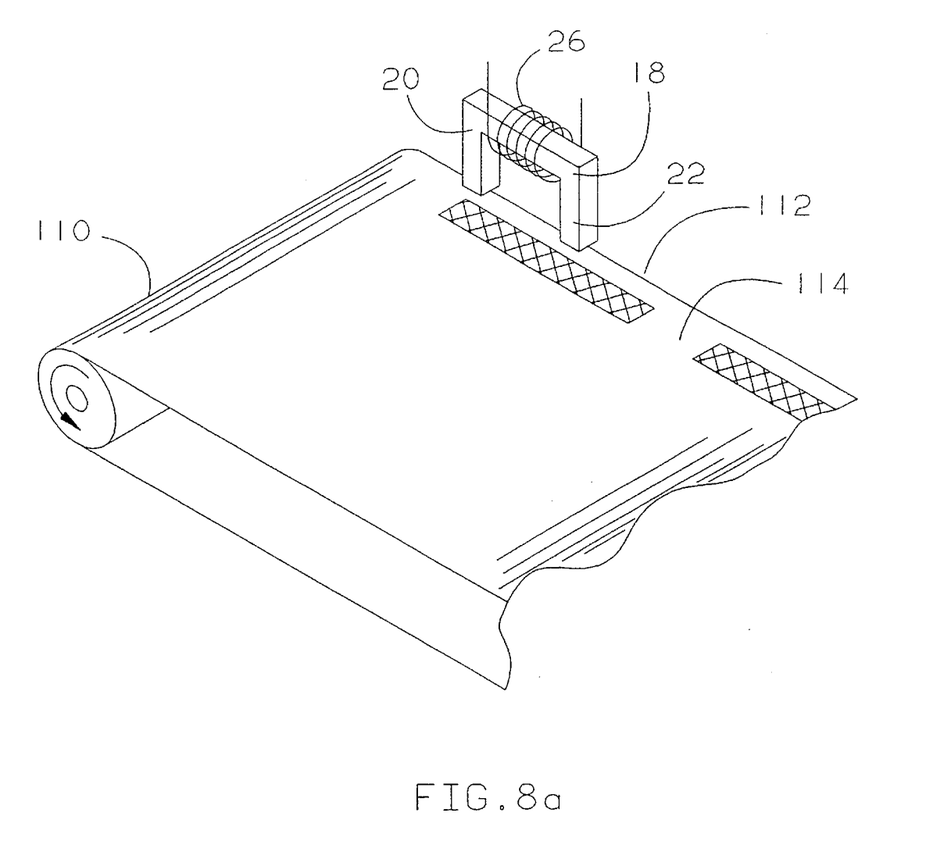
FIG. 8a is a diagram of an embodiment of the instant invention in a conveyer system.

FIG. 8a illustrates an alternative embodiment of the instant invention wherein the means for repeatably increasing and decreasing the inductive coupling between the two legs of the core 18 is realized by a moving conveyer belt 110. The core 18 is mounted in close proximity to the belt 110 which has alternating areas of magnetic flux conducting material 112 and non-conducting material 114. As the belt moves in a linear direction in FIG. 8, the magnetically conductive area 112 first comes into proximity of leg 22 of core 18. As the belt continues to move, the beginning of area 112 approaches leg 20 while still in proximity of leg 22 which increases the inductive coupling between the two legs 20 and 22 of the core 18. Continuing to move with the belt 110, the area 112 passes proximity with leg 22 which then decreases the inductive coupling between the two legs 20 and 22 of the core 18. The non-magnetically conductive area 114 then comes in proximity with leg 22 and leg 20 resulting in a zone of approximately no inductive coupling between the two legs 20 and 22. This process is repeated as desired, and may include a plurality of cores placed along the length of the belt 110 on either the top, bottom, or both. These additional cores 18 may be placed so as to result in a poly-phase output having improved power quality.

Figure 8B:
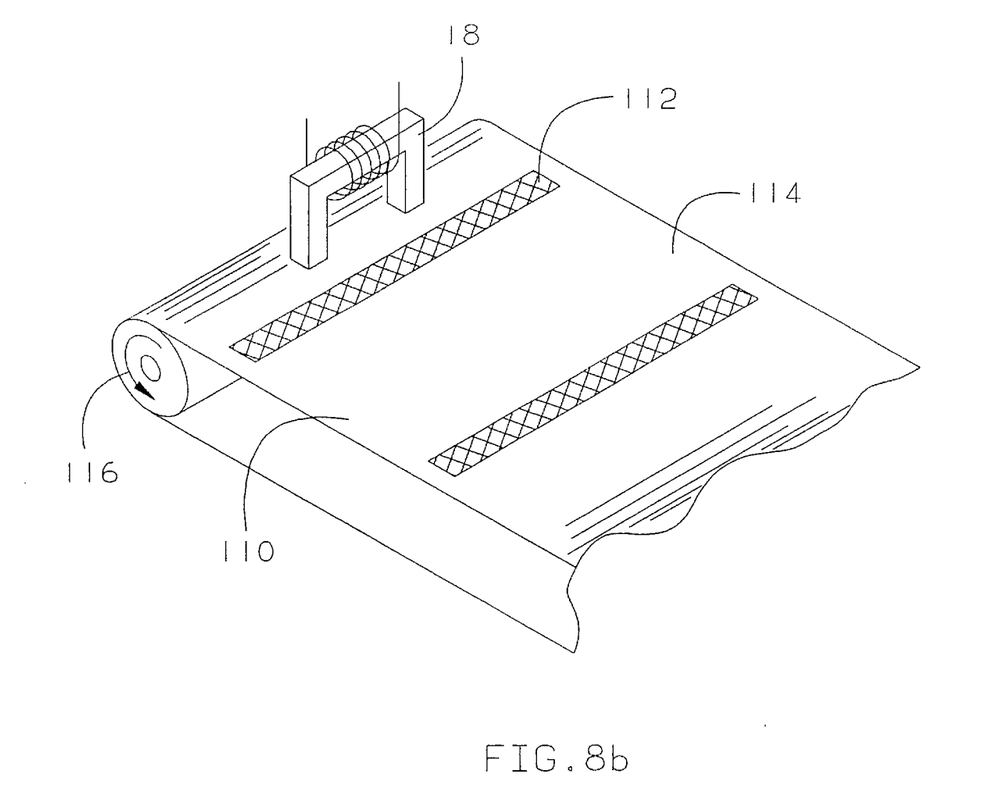
FIG. 8b is a diagram of an alternate embodiment of the instant invention in a conveyer system.

Additionally, as illustrated in FIG. 8b, the core 18 may be rotated 90° with respect to the embodiment of FIG. 8a. In this way the zones of magnetic conductivity 112 are not subject to bending forces as they cycle past the roller 116 of the belt 110. With this embodiment, the inductive coupling between legs 20 and 22 increases as the area 112 approaches both legs 20 and 22, peaks when the area 112 is in proximity with the legs 20 and 22, and decreases as the area 112 moves away from both legs 20 and 22. As with the embodiment of FIG. 8a, multiple cores 118 may be utilized to provide an increased power output. Additionally, the cores 118 may be staggered to provide a poly-phase output which results in better power quality.

The operation of generating electric power from these embodiments is similar as described above. The coil 26 is energized prior to the decrease in inductive coupling between the two legs 20 and 22 by enabling the switches 50 and 52 (see FIG. 4). The switches 50 and 52 are then de-energized during the reduction of inductive coupling between the two legs 20 and 22, thereby forcing current flow back to the bus 30 resulting in a net power generation from the winding 26. As with the other embodiments described above, the control of the output power may be accomplished as known in the art by varying the turn-on and/or turn-off times, fixing the turn-on and turn-off and performing current chopping, etc.

Figure 9:
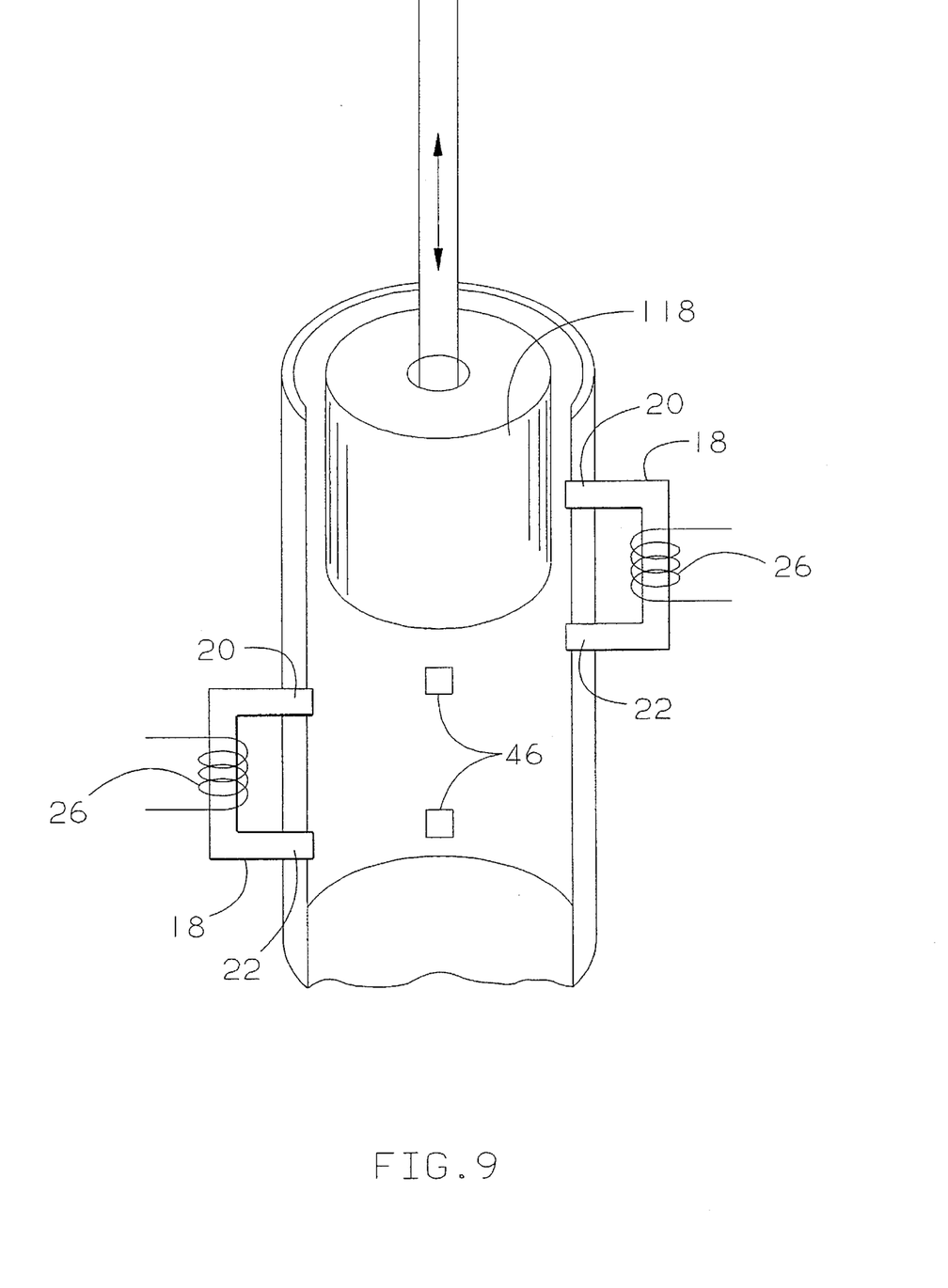
FIG. 9 is a diagram of an embodiment of the instant invention in a piston system.

FIG. 9 illustrates another embodiment of the instant invention wherein a magnetically permeable reciprocating surface 118 is in relative movement with respect to the core 18. As illustrated therein, the surface 118 is embodied as a piston, although a bobbin, a ramrod, a jackhammer, etc. may provide the same reciprocal up-and-down action. In this embodiment the inductive coupling between the legs 20 and 22 increases as the piston 118 comes into proximity with leg 20 and approaches proximity with leg 22. The inductive coupling peaks when the piston 118 is in proximity with both legs 20 and 22, and decreases as the piston goes out of proximity with one of the legs 20 or 22. Multiple cores 18 may be placed around the piston 118 as illustrated in FIG. 9, or they may be placed in line with its movement as desired. Additionally, the cores 18 may be staggered along the pistons movement to allow a poly-phase output to be generated, thus improving power quality of the generated power. Also, as with the embodiment of FIG. 8b, the cores 18 may be rotated as desired without departing from the spirit and scope of the invention.

The operation of generating electric power from this embodiment is similar as described above. The coil 26 is energized prior to the decrease in inductive coupling between the two legs 20 and 22 by enabling the switches 50 and 52 (see FIG. 4). The switches 50 and 52 are then de-energized during the reduction of inductive coupling between the two legs 20 and 22, thereby forcing current flow back to the bus 30 resulting in a net power generation from the winding 26. As with the other embodiments described above, the control of the output power may be accomplished as known in the art by varying the turn-on and/or turn-off times, fixing the turn-on and turn-off and performing current chopping, etc.

Figure 10:
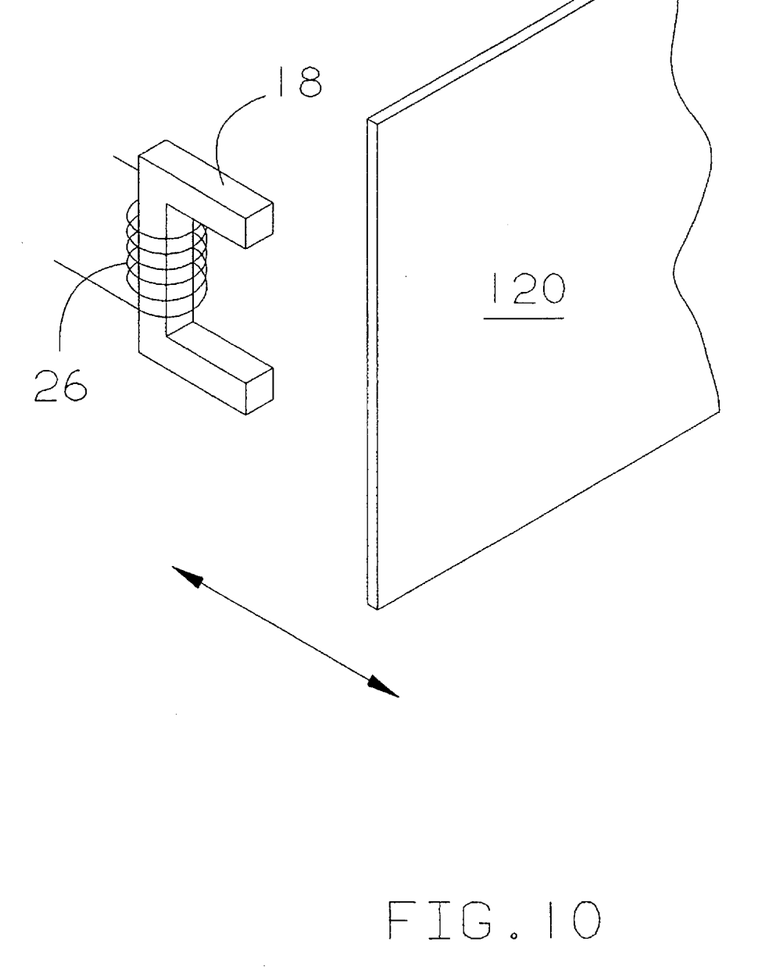
FIG. 10 is a diagram of an embodiment of the instant invention utilizing a reciprocating surface.
Figure 11:
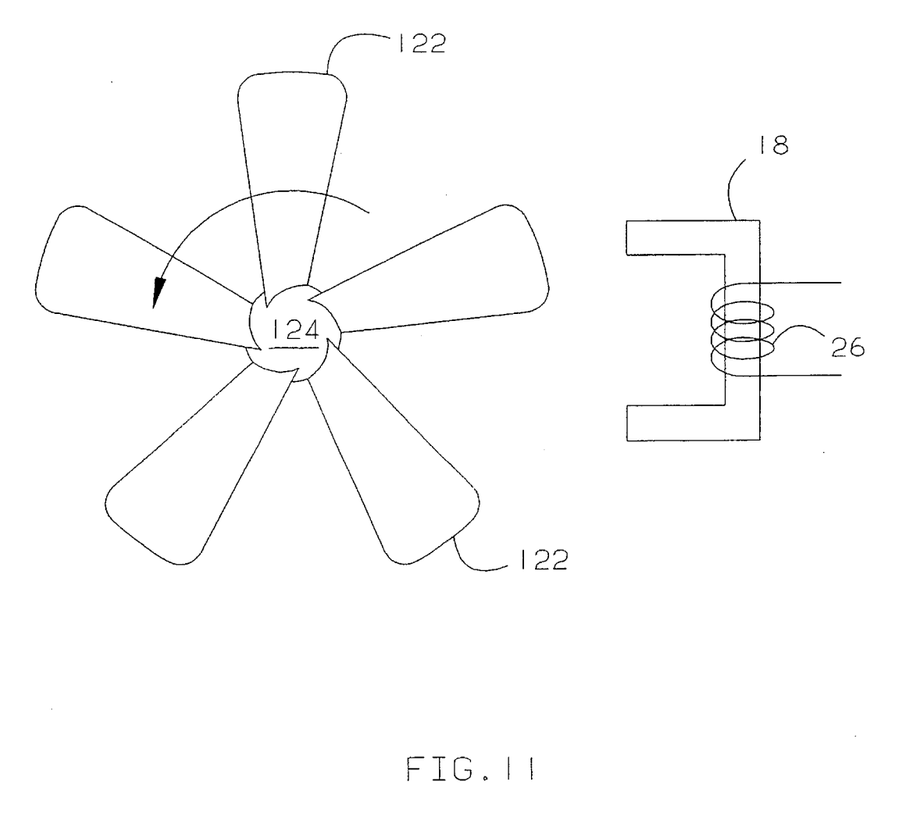
FIG. 11 is a diagram of an embodiment of the instant invention utilizing a propeller drive system.

FIG. 10 illustrates yet another embodiment of the instant invention wherein a magnetically permeable reciprocating surface 120 is in relative movement with respect to the core 18. As illustrated therein, the relative movement increases and decreases the airgap between the core 18 and the surface 120, thus increasing and decreasing the inductive coupling between the two legs. While this figure illustrates a reciprocating surface 120, it will be understood by one skilled in the art that the core 18 is capable of generating electrical energy in any environment producing a periodic increase and decrease of inductive coupling between the legs of the core 18. FIG. 11 illustrates another embodiment of the instant invention wherein the blades 122 of a fan 124 provide magnetically permeable surfaces in relative movement with respect to the core 18. In this embodiment as the blades 122 sweep past the core 18, the inductive coupling is first increased then decreased. The operation of these embodiments is similar as described above with reference to FIG. 4.

Numerous other modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An electric power generation system, comprising:

a first core having two legs;

a winding wound on said first core between said two legs;

first means for providing a magnetic path between said two legs to allow inductive coupling therebetween, said first means repeatably increasing and decreasing said inductive coupling between said two legs of said first core;

second means for selectively coupling and decoupling said winding to and from a source of dc power and to and from a dc bus, said second means allowing current flow from at least said dc source during said coupling, and allowing current flow from said winding during said decoupling; and wherein said second means couples said winding to said dc source prior to said decrease of said inductive coupling and decouples said winding from said dc source during said decrease of said inductive coupling, said winding supplying dc power to said dc bus thereby.

2. The system of claim 1, wherein said first means additionally provides a zone of constant inductive coupling between said increasing and said decreasing, and wherein said second means couples said winding to said dc source during said zone of constant inductive coupling.

3. The system of claim 1, wherein said dc source comprises:

a second core having two legs, said second core comprising a permanent magnet;

a second winding wound on said second core between said two legs; and wherein first means additionally repeatably increases and decreases an inductive coupling between said two legs of said second core; and wherein said second winding produces an ac electrical output in response to said increasing and decreasing inductive coupling; and third means coupled to said winding for rectifying said ac output to form said dc power.

4. The system of claim 3, wherein said second means senses said ac electric output from said second winding to determine when said inductive coupling is increasing and decreasing.

5. The system of claim 1, wherein said first means comprises a gear having a plurality of teeth, adjacent teeth defining a tooth gap therebetween, said gear being rotated by an external source of rotational energy.

6. The system of claim 1, wherein said first means comprises a conveyer belt having a plurality of areas of magnetically conductive material separated by an area of non-magnetically conductive material, said conveyer belt being in linear motion.

7. The system of claim 1, wherein said first means comprises a reciprocating surface, said reciprocating surface being magnetically conductive.

8. The system of claim 7, wherein said reciprocating surface is moving orthogonal to a plane of said core.

9. The system of claim 7, wherein said reciprocating surface is moving within a plane of said core.

10. The system of claim 1, wherein said first means comprises a propeller, said propeller having a plurality of blades in rotational movement, said blades being magnetically conductive.

11. A mechanical gear drive system capable of generating electric power, comprising:

a gear having a plurality of teeth, adjacent teeth defining a tooth gap therebetween, said gear being rotated by a source of rotational energy;

a first U-shaped core having two legs and a yoke, said legs defining a distance therebetween of at least one tooth gap, said first core positioned in close proximity to said teeth so as to define a first airgap therebetween;

a first coil wound on said yoke;

a converter having at least a first and a second switching means for coupling said first coil to a source of dc power, and at least a first and a second commutation means for cross-coupling said first coil to said source to allow current flow back when said switching means are disabled.

12. The system of claim 11, wherein said converter enables at least said first and said second switching means prior to alignment of said teeth with said legs of said first core thereby coupling said first coil to said source of dc power and allowing dc current to flow from said source, through at least said first switching means, said first coil, and at least said second switching means, said converter further disabling at least said first and said second switching means after alignment of said teeth with said legs, thereby decoupling said first coil from said source and forcing dc current flow back from said first coil, through at least said first and said second commutation means, and to said source to allow generation of electric power.

13. The system of claim 11, wherein a width of at least a bottom of said two legs is wider than a width of said teeth.

14. The system of claim 13, wherein said converter enables at least said first and said second switching means during alignment of said teeth with said legs of said first core thereby coupling said first coil to said source of dc power and allowing dc current to flow from said source, through at least said first switching means, said first coil, and at least said second switching means, said converter further disabling at least said first and said second switching means after alignment of said teeth with said legs, thereby decoupling said first coil from said source and forcing dc current flow back from said first coil, through at least said first and said second commutation means, and to said source to allow generation of electric power.

15. The system of claim 11, wherein said source of dc power comprises:

a second U-shaped core having two legs and a permanent magnetic yoke, said legs a distance therebetween of at least one tooth gap, said second core positioned in proximity to said teeth so as to define an airgap therebetween;

a second coil wound on said magnetic yoke;

means coupled to said second coil for rectifying an electrical output of said second coil generated in response to rotation of said gear.

16. The system of claim 15, wherein said second coil is additionally coupled to said converter, and wherein said converter utilizes said electrical output of said second coil to determine relative position of said teeth and said legs of at least said first core.

17. The system of claim 11, wherein said alignment of each tooth of said gear with a leg of said first core presents an opportunity to enable said first and second switching means, and wherein said converter varies the percentage of opportunities at which said first and second switching means are enabled to allow control of a magnitude of said electric power generated thereby.

18. In a gearbox having at least a first rotating metallic gear having a plurality of teeth meshing with teeth of a second gear, a system to generate electric power, comprising:

a first U-shaped core having two legs and a yoke, said first core positioned in close proximity to the teeth of the gear;

a first coil wound on said yoke;

a converter having at least a first and a second switching means for coupling said first coil to a source of dc power to energize said first coil, and at least a first and a second commutation means for cross-coupling said first coil to said source to allow current flow back when said switching means are disabled.

19. The system of claim 18, wherein said converter enables at least said first and said second switching means prior to alignment of the teeth of the gear with said legs of said first core to establish a current flow therethrough, said converter further disabling at least said first and said second switching means after alignment of the teeth with said legs to allow dc current flow back from said first coil to said source generating electric power through switched reluctance action thereby.

20. The system of claim 18, wherein a width of at least a bottom of said two legs is wider than a width of the teeth.

21. The system of claim 20, wherein said converter enables at least said first and said second switching means during alignment of the teeth of the gear with said legs of said first core to establish a current flow therethrough, said converter further disabling at least said first and said second switching means after alignment of the teeth with said legs to allow dc current flow back from said first coil to said source generating electric power through switched reluctance action thereby.

22. The system of claim 18, wherein said source of dc power comprises:

a second U-shaped core having two legs and a permanent magnetic yoke, said second core positioned in proximity to the teeth of the gear;

a second coil wound on said magnetic yoke;

means coupled to said second coil for rectifying an electrical output of said second coil generated in response to rotation of the gear.

23. The system of claim 22, wherein said second coil is additionally coupled to said converter, and wherein said converter utilizes said electrical output of said second coil to determine relative position of the teeth of the gear and said legs of said first core.

24. The system of claim 18, wherein alignment of each tooth of the gear with a leg of said first core presents an opportunity to enable said first and second switching means, and wherein said converter varies the percentage of opportunities at which said first and second switching means are enabled to allow control of a magnitude of said electric power generated thereby.

* * * * *